Jan. 24, 1928.
J. G. AHLERS
1,656,904
CONCRETE STRENGTH REGULATOR
Filed April 6, 1927
2 Sheets-Sheet 1
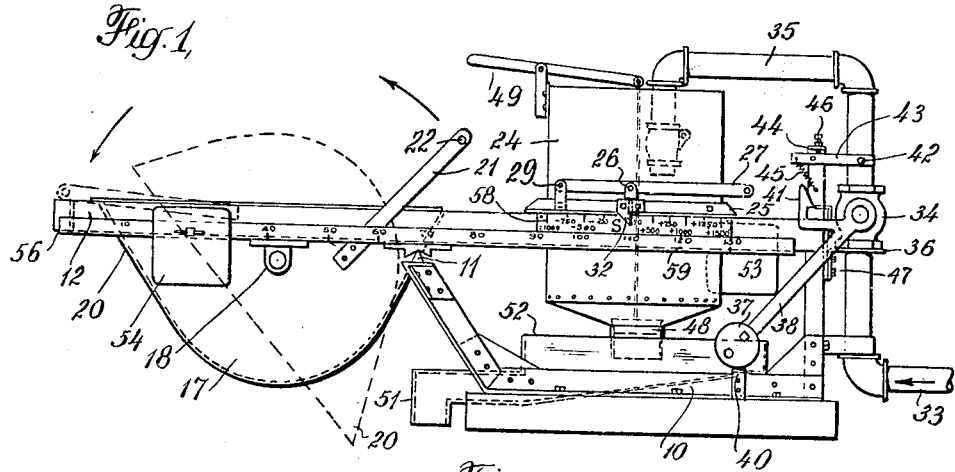
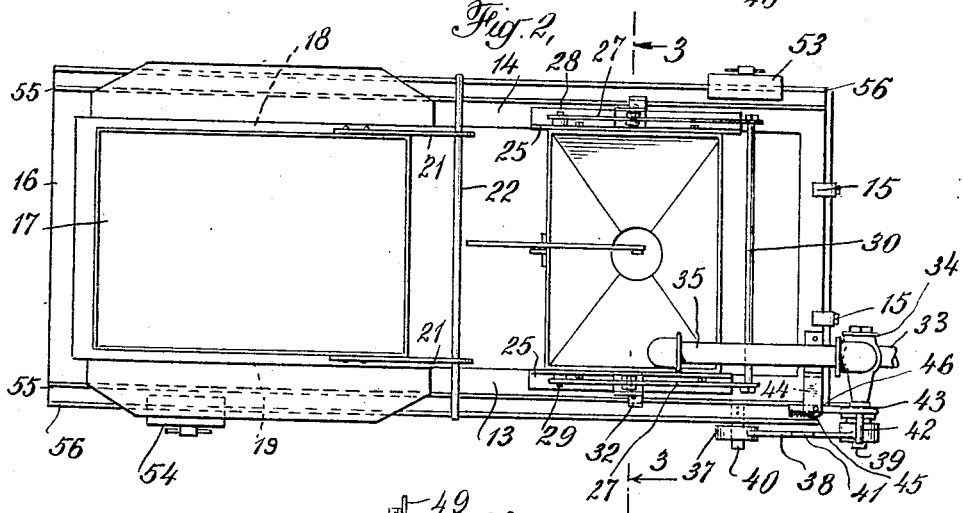
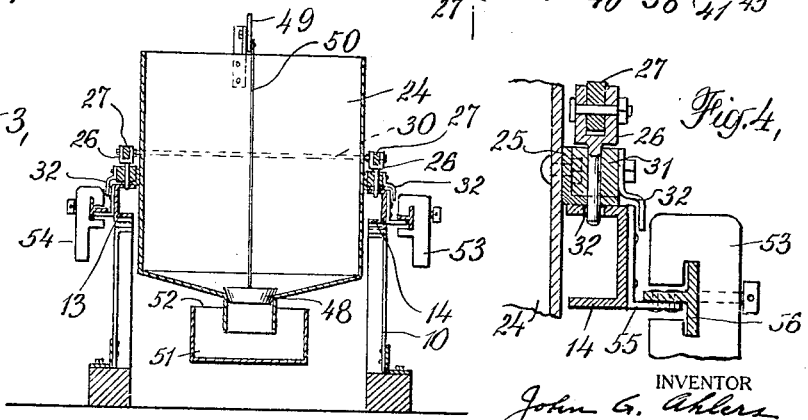
INVENTOR
John G. Ahlers
BY
Pennie, Davis, Marvin & Edmonds
his ATTORNEYS Jan. 24, 1928.
1,656,904
J. G. AHLERS
CONCRETE STRENGTH REGULATOR
Filed April 6, 1927  2 Sheets-Sheet 2
*Fig. 5,*
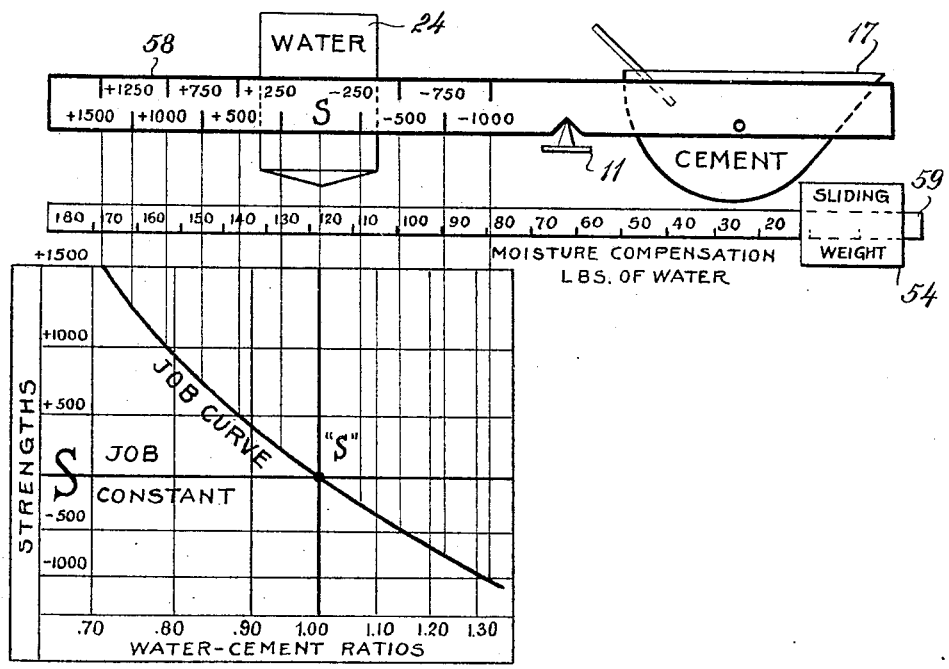
INVENTOR
John G. Ahlers
BY
Pennie, Davis, Marvin & Edmonds
his ATTORNEYS Patented Jan. 24, 1928.

1,656,904

UNITED STATES PATENT OFFICE.

JOHN GORDON AHLERS, OF NEW YORK, N. Y.

CONCRETE-STRENGTH REGULATOR.

Application filed April 6, 1927. Serial No. 181,355.

This invention relates to the making of concrete for use in constructing buildings and other structures and more particularly to concrete strength regulators. The improved apparatus for regulating the strength of concrete of the present invention is similar to the apparatus described in my application for "concrete making", Serial No. 77,722, filed December 26, 1925.

Concrete comprises a mixture of cement, water and aggregate materials. It was long thought that the strength of concrete was primarily dependent not only upon the quality of the aggregate material but upon the ratio of the amount of aggregate material to the quantity of cement.

As a result of extended investigations at the Lewis Institute, Chicago, Illinois, it has been established that the strength of concrete depends primarily on the ratio of water to cement. The results of tests carried on during these investigations were plotted against coordinates representing the compressive strength of the concrete in pounds per square inch at 28 days, and the water-cement ratio. These curves were substantially parallel. Each of these curves represented certain actual working conditions; that is, the other influencing factors such as the quality of cement, the quality or cleanliness of aggregates, and the length of time, thoroughness of mixing and handling remained constant for each curve, the ratio of water to cement alone being varied.

For any particular job it is possible to establish a similar curve depending primarily on the the quality of cement and kind and cleanliness of aggregate to be used. Furthermore, it will only be necessary to locate one point on this curve, for the curve will be substantially parallel to the Lewis Institute curves.

The most convenient point to locate is for a ratio of water to cement equal to one, (i. e. one cubic foot of water or 7½ gallons to one bag of cement containing in the United States 1 cubic foot of cement and weighing 94 pounds). We will refer to this point as the job constant and to the curve as the job curve.

One of the objects of the present invention is to produce a regulator which will assure the correct mixing of water and cement according to the requirements of the particular job even when operated by unskilled operators.

Another object is to produce a regulator, which, when the job constant has been ascertained, will indicate the resulting compressive strength of the concrete for any setting of said regulator.

Another object is to produce a regulator which may be set so as to compensate for the moisture content of the aggregate and in which the compensating scale will read directly in pounds of water.

The invention consists briefly in applying the water ratio theory as developed by the Lewis Institute to an apparatus through which the amount of concrete which is fed to the apparatus, will control the amount of water supplied to the apparatus.

According to the invention, an appropriate amount of cement for a given batch of concrete is introduced into a solids receptacle which is operatively associated with a balance. Water is supplied to a liquid receptacle operatively arranged to balance the solids receptacle and the supply of water is automatically interrupted when the contents of the two receptacles attain a predetermined ratio of water to cement. The balance consists of arms supported by a knife edge fulcrum. These arms support the cement hopper and the water receptacle. Compensating weights are slidably mounted on said arms so that the moisture content of the aggregate may be easily compensated by adjusting the position of the weights. Means are provided so that the contents of the cement hopper and the water receptacle may be easily discharged into the concrete mixing apparatus, the balance arms being prevented from tilting during the discharge.

The aggregate material is then added to the mixer until the mixture has attained the desired workability or plasticity. The amount of aggregate added will not materially affect the strength of the concrete so long as the mixture remains sufficiently plastic to be poured.

The strength of the resulting concrete depends therefore on the setting of the regulator which automatically regulates the mixture of cement and water for any desired strength of concrete, the job constant having been ascertained.

The regulator's operation is extremely simple and it may be operated by unskilled laborers, without affecting the accuracy of its mixing, requiring only the preliminary setting at the beginning of a job and the occasional adjustment of the compensating weight to accord with the variations of moisture in the aggregate.

The regulator, therefore, insures within narrow limits a certain, fixed strength of the resulting concrete and permits using the most economical mix in attaining that desired strength.

For an example of apparatus adapted for carrying out the invention, reference is made to the accompanying drawings, in which Fig. 1 is a side elevation;

Fig. 2 is a plan view;

Fig. 3 is a vertical section taken along line 3—3 of Fig. 2;

Fig. 4 is a detailed view of the compensating weight and guide and the mechanism for locking the liquid receptacle in adjusted position; and Fig. 5 is a diagrammatic view of the concrete strength regulator and strength curve.

Referring to these drawings and in particular to Fig. 1, a supporting frame-work 10 of suitable steel shapes and adapted to be fixed to a foundation of wood or cement, supports the various elements of the regulator.

At the left hand end of the frame-work 10, two knife edge supports 11 are provided as a fulcrum for a balance beam 12. This balance beam 12 comprises a rectangular frame, having two spaced longitudinal channels 13 and 14, suitably connected at their ends by cross beams 15, 16.

At the left hand of the balance beam there is a cement receptacle or hopper 17 pivotally secured to the side channels 13, 14 at 18 and 19 respectively. This hopper is adapted to receive cement and is equipped with a spout 20 by which the cement can be dumped into the mixing apparatus at the proper time by rotating the hopper about its pivots with the aid of its handle 21. The handle 21 has a lateral bar 22 which will strike against balance beam 12 when hopper 17 has reached a discharging position and will prevent further rotation of hopper 17 about its pivot. In Fig. 1 the hopper is shown in its discharging position in dotted lines. The sections of channels 13, 14 which adjoin the hopper are provided with buffer plates 23 which protect the channels and also serve as a convenient rest for the cement bags when cement is being supplied to the hopper.

To the right the balance beam 12 carries a water receptacle or container 24 which is slidably adjustable on channels 13, 14, the angle beams 25, projecting from said container and resting on the top flange of said channels, permitting a sliding motion of container along said channels. It will be noted, however, that hopper 17 is fixed to the channels and the distances between the knife edges 11 and the hopper pivots 18 and 19 is not adjustable and always remains constant.

The container 24 may be locked in any position to which it has been adjusted by means of plungers 26 shown in Fig. 4. The plungers 26 are pivoted to handles 27 which are in turn pivoted to the container at 28 and 29. The two handles 27 are connected at their ends by a rod 30. By lifting rod 30 the handles will rotate about their pivot points 28, 29 and plungers 26 will be raised. The guides 31 for the plungers are suitably attached to angle beams 25, said angle beams being provided with an opening below said guides to permit the plungers to pass therethrough. The top flange of channels 13, 14 are provided with openings 32 adapted to receive the plungers, said openings being situated at determined distances from knife edges 11. When rod 30 is lowered plungers 26 will pass through openings 32 in the channels thus locking the container in the desired position.

In order to slide the container to a different predetermined position, plungers 26 must be raised by lifting rod 30, when the container will be free to move along the channels until rod 30 is again lowered, locking the container in a predetermined position. The guides 31 are provided with pointers 32. Water is supplied to container 24 through the supply pipe 33, automatic valve 34 and the pipe 35. The automatic valve 34 is supported by an angle 36 projecting from right hand end of supporting frame-work 10. This valve is biased to the closed position by means of a weight 37 carried by an arm 38 that is secured to shaft 39 of the rotatable member of the valve. In the position shown in the drawings the valve is closed and weight 37 rests on a suitable support 40 projecting from framework 10. To open the valve, arm 38 is raised and it is held in this raised position by means of a suitable latch mechanism. This mechanism includes a hook 41 forming a part of arm 38 and so disposed thereon that, when the valve is in the open position, hook 41 will occupy a horizontal position.

The valve 34 is held open by the engagement of the right hand vertical wall of the notch of hook 41 with a latch pin 42. This latch pin 42 is carried by an arm 43, said arm being pivoted to the web of a Z upright 44 which is bolted or riveted to the balance beam 12. A spring 45 is attached to the end of arm 43 on the other side of pivot and tends to lower left hand end of arm 43 and consequently to raise the right hand end of arm 43 carrying the latch pin.

A screw bolt 46 carried by the upper flange of Z upright 44 acts as an adjustable stop and limits the upward motion of latch pin 42 by acting on arm 43, thus determining the normal position of latch pin 42.

When it is desired to open the valve and the flow of water into container 24 through pipe 35, arm 38 is moved upwardly from the closed position, thereby rotating valve shaft 39 and hook 41 in a clockwise direction. As arm 38 approaches the opening position the sloping face of hook 41 slidingly engages latch pin 42, thus depressing latch pin 42 and pivoted arm 43 against the action of the spring. When arm 38 reaches the wide open position latch pin 42 snaps upwardly into the notch of hook 41 and holds the valve in the open position only so long as the weight of cement in the hopper is heavier than the weight of water in the container. As soon as the water in the container starts to overbalance the weight of cement in the hopper, the right hand portion of balance beam 12 moves downwardly and carries Z upright 44, arm 43 and latch pin 42 with it. The latch pin 42 is thus moved out of the slot of hook 41 allowing weight 37 to descend against stop 40 and to close the valve. When the right hand end of balance beam 12 has descended sufficiently to release hook 41 it will have reached a horizontal position where the right hand end of the balance beam will rest against supporting frame-work 10 and thus further downward motion of the balance beam will be prevented. When the balance beam has been emptied of its cement and water, a new batch of cement is added to the hopper causing the right hand end of the balance beam to rise until it comes into contact with stops 47 which consist of angles bolted to the supporting frame-work. In this slightly inclined position of the balance beam, the latch pin 42 carried thereby is in position to engage the notch in hook 41, as arm 38 is raised to open the valve. As the container is filled, the container end of the balance beam will descend until it reaches a horizontal position when the weight of water will just over-balance the cement and the valve will be automatically closed as described.

In order to discharge the water from the container, a valve 48 is arranged to close an opening in the bottom of the container and the valve is lifted by hand by the pivoted lever 49 connected thereto by the link 50.

The water thus released is discharged into a conduit 51 which leads over to the left end of the apparatus so that both the water and the cement may be discharged at approximately the same point into the mouth of the mixer. In order to provide for the adjustment of container 24 along balance beam 12, conduit 51 has an elongated opening 52 so as to receive the water from the valve 48 at any position of the container upon the balance beam.

In order to compensate for the moisture content of the aggregate the balance beam is provided with two sliding weights 53, 54. Referring to Fig. 4, angles 55 are riveted to channels 13, 14 and the stems of T beams 56 are riveted to angles 14. The T beams 56 serve as a guide and support for weights 53, 54.

In employing this apparatus to carry out the process of the present invention, it is first necessary to obtain the job constant (i. e. the strength of resulting concrete for a ratio of water to cement equal to one). From the job constant (see Fig. 5) as indicated above, the job curve may be drawn, the coordinates being the strength of concrete and the ratio of water to cement. For any desired strength of concrete, from the job curve the corresponding water ratio to produce that strength may be ascertained. As the job curves for different jobs are substantially parallel, a certain decrease in the water ratio, for instance from 1.00 to .94, will always cause the same corresponding increase in strength of the concrete, that is, an increase of 250 pounds per square inch, whatever the actual value of the job constant may be in the different jobs. In this manner, when the container is set on the balance beam so that the water ratio will be .94, the strength of the resulting concrete will be the value of the job constant plus 250 pounds per square inch. Likewise, for a setting giving a water ratio of 1.06 the strength of the resulting concrete will be the value of the job constant minus 250 pounds per square inch.

A scale 58 may be added to the balance beam to show what the ratio of water to cement will be for any position of the container. The values on this scale are ascertained by trial. Furthermore, the different water ratio values on this scale may be transposed into the values of the strength of concrete above or below the job constant. Indicating the job constant as S, for instance, for a water ratio of 1.06 the strength of concrete will be S minus 250 pounds, for a water ratio of 1 the strength of concrete will be S, and for a water ratio of .94 the strength of concrete will be S plus 250 pounds per square inch.

Let us suppose that for a particular job we ascertained the job constant to be 2050 pounds and that the strength required is 1800 pounds. The difference between the job constant S and the required strength is minus 250 pounds. We would then adjust container on the balance beam until the pointers 32 mark the point −250 on the scale, and then lower the rod 30, locking container in this position. We may now proceed to dump cement into the hopper, open the valve and wait till the valve automatically closes as described. The water and cement may then be discharged into the container where the aggregate is added to the mix. The strength of the concrete will not be materially affected by the quantity of aggregate added provided the mix remains sufficiently plastic and workable. However, if the aggregate contains moisture, as it almost invariably will, it is necessary to compensate for it. The moisture content is ascertained by drying and cooling representative samples of the aggregate, weighing the same before and after the drying operation. If the moisture content is, for instance 3% and the average amount of aggregate added to each batch of cement and water is 1300 pounds, then there is 39 pounds of water in the aggregate and this amont is compensated for by the regulator.

This compensation is effected by two weights 53, 54 which may be slid along T beams 56. The weight 53, for instance, is used simply as a counter or balance weight for weight 54. A scale 59 in pounds is inscribed on the T beam 56 for the weight 54 starting near the left hand end of balance beam and ending near the right hand end of balance beam. When weight 54 is on the zero mark of the scale near the left hand end of the balance beam the counter weight 53 is situated on the right hand end of the balance beam an equal distance from the knife edges 11 so as to exactly counterbalance the weight of weight 54. The counter weight is fixed in this position. As the compensator weight is moved along the scale towards the right hand end of balance beam the counter weight 53 overbalances the compensator weight 54 and when the compensator weight 54 passes to the right hand side of the balance beam both compensator weight 54 and the fixed counter weight 53 act on the right hand end of balance beam.

The scale is graduated in pounds in such a manner that for any setting of the compensator weight 54 it will indicate the combined effect of the weights 53, 54 on the container when the container is at the S or job constant position which is the same as the position for a ratio of water to cement equal to 1.00. The size and weight of the weights 53, 54 may be so adapted that the range of the compensation scale will meet all actual job values.

The moisture compensation scale 59 is correct only when the container is at the position S for a strength of concrete equal to the job constant, i. e. for a ratio of water to cement equal to 1.00. For example, if the container is moved to a position along the balance beam for a strength of concrete equal to S minus 250 pounds corresponding to a water ratio of 1.06, the values on the compensation scale will have to be corrected to correspond to this new position of the container, i. e., the compensating weight will have to be moved in order to have the same effect on the container in the new position of the container as it had in the old. The correcting factor for this new position may be calculated and in this instance is .94.

Referring to our example where we found that the moisture content of the aggregate per batch was 39 pounds, if the container is in the position S the compensator weight would be set directly on the graduation on the scale marked 39 pounds; if the container is in the position —250, the compensator weight is set about half way between the graduations on the scale marked 36 pounds and 37 pounds, as 39 pounds multiplied by the correction factor .94 for this position of the container, gives 36.66 pounds. A table is placed on the outside of the container indicating the correction factors for the different settings of the container.

By means of these arrangements the setting of the regulator is greatly simplified without affecting its accuracy.

To summarize the method of operation, let us suppose that the job constant ascertained is 1850 pounds and the required strength of the concrete is 2100 pounds. The difference between the job constant and the required strength is +250 pounds. The container will be set so that pointer 32 marks +250 on the scale. Let us further assume that the moisture content of the aggregate for each batch is 50 pounds. By referring to the table on the container, we find the correction factor for a setting of the container at +250. The factor for this setting is 1.06. Therefore we will set the compensating weight on the graduation of the compensation scale marked 53. We may now turn the regulator over to unskilled operators and feel assured that the resulting concrete will meet the required strength requirements.

The use of this regulator will satisfy the architect that the concrete will be of the required strength and the contractor that he is using the most economical mix to meet the requirements.

Very often in the same job the requirements vary, i. e. for part of the building the required strength of concrete will be only 1850 pounds, for instance. To meet this change in requirement the container is set so that pointer 32 marks S on the scale and the compensator weight is moved from graduation 53 pounds to 50 pounds.

The improved regulator of the present invention will withstand rough treatment without having its accuracy noticeably affected.

I claim:

1. In a concrete strength regulator, a supporting frame, parallel balance arms fulcrumed upon said frame, a cement hopper pivotally secured on said balance arms on one side of said fulcrum, a water container slidably carried on said balance arms on the opposite side of said fulcrum, and a strength scale on said balance arms to indicate for any setting of said container on said balance arms the compressive strength of the concrete resulting from mixture of cement and water in said hopper and container, and means for limiting the motion of said balance arms about said fulcrum.

2. A concrete strength regulator comprising a cement hopper, a water container, said hopper and said container being operatively associated with a balancing mechanism, a valve controlling admission of water to said container and actuated by said balancing mechanism so that said valve will be closed when said hopper and said container reach a balanced relationship, said container being capable of adjustment on said balancing mechanism so as to vary the ratio of water to cement when said container and said hopper reach a balanced relationship, a strength scale for indicating the strength of the resulting concrete for any position of the container on said balancing mechanism, compensating weights slidably carried by said balancing mechanism and adapted to compensate for the water content of the aggregate material to be mixed with the water and cement, and a compensation scale adapted to indicate for any position of said weights the compensating effect of said weights for a given position of said container on said balancing mechanism.

3. In a concrete strength regulator, a supporting frame, two balance arms connected by cross members and fulcrumed upon said frame, means on said supporting frame for limiting the pivoting motion of balance arms about the fulcrum, a cement hopper pivotally secured to said balance arms, a water container slidably carried by said balance arms, a strength scale on said balance arms to indicate for any position of said container on said balance arms the strength of concrete resulting from mixture of cement and water in said hopper and container, compensating weights slidably carried by said balance arms, and a compensating scale adapted to indicate the compensating effect of said weights on said container for a predetermined setting of said container on the strength scale.

4. In a concrete strength regulator, a supporting frame, two parallel balance arms fulcrumed upon said frame, a cement hopper pivotally secured on said balance arms on one side of the fulcrum, a water container slidably carried on said balance arms on the opposite side of the fulcrum, means on said supporting frame for limiting the oscillations of said balance arms, two weights slidably carried by said balance arms, one of said weights acting as a counter weight for the other compensating weight, so that a desired compensating effect on the container may be obtained by sliding only one of said weights along said balance arms.

5. In a concrete strength regulator, a supporting frame, two parallel balance arms connected at their ends by cross members and pivotally mounted upon said frame, a cement hopper pivotally carried between said balance arms, a water container slidably carried between said balance arms, said supporting frame being adapted to limit the balancing motion of said balance arms, an arm pivoted to said water container, a plunger operatively associated with said arm, one of said balance arms having openings for receiving said plunger so that the container may be locked in any desired position by lowering said arm carrying said plunger.

6. In a concrete strength regulator, a supporting frame carrying two knife edges, two balance arms connected by cross members and pivoted on said knife edges as a fulcrum, means on said supporting frame for limiting the movement of said balance arms about the fulcrum, a cement hopper pivotally secured to said balance arms on one side of the fulcrum, a water container slidably carried by said balance arms, an arm pivoted at each side of said container, plungers operatively associated with said arms, said balance arms having openings to receive said plungers, and a cross member rigidly connecting the outer ends of said arms so as to actuate said arms simultaneously to lock the container in any desired position on said balance arms.

7. In a concrete strength regulator, a supporting frame, two parallel balance arms connected by cross members and fulcrumed upon said frame, a cement hopper pivotally secured between said balance arms, a water container slidably carried by said balance arms, said frame being adapted to limit the motion of said balance arms about the fulcrum, an arm pivoted to said water container, a plunger operatively associated with said arm, one of said balance arms having openings to receive said plunger so that the container may be locked in any desired position by lowering said arm, a strength scale on said balance arms to indicate the strength of the concrete resulting from mixture of cement and water in said hopper and said container for any position of said container on said balance arms, said balance arm having the openings therein arranged to correspond with the graduations on said strength scale.

8. In a concrete strength regulator, a supporting frame provided with two knife edges, two parallel balance arms connected by cross members and pivoted on said knife edges as a fulcrum, a cement hopper pivotally secured between said balance arms, a water container slidably carried by said balance arms, a handle on said hopper for rotating said hopper around its pivot, said handle being provided with a projecting element which is adapted to strike against said balance arms when the hopper is in its discharging position whereby said hopper is prevented from rotating beyond this position.

9. In a concrete strength regulator, a supporting frame provided with two knife edges, two parallel balance arms pivoted on said knife edges as a fulcrum, a cement hopper pivotally mounted on said balance arms on one side of the fulcrum, a water container slidably carried by said balance arms on the opposite side of the fulcrum, a valve controlled conduit supported by said supporting frame for supplying water to the container, a weighted arm actuating the valve in the conduit whereby said valve may be automatically closed when said arm is released, a member on said frame and adapted to act as a rest for said weighted arm when the valve is closed, a latch mechanism for holding the weighted arm in open valve position until said hopper and said container reach a balanced relationship, and means, on said supporting frame for limiting the balancing motion of the balance arms about the fulcrum.

10. A concrete strength regulator comprising a cement hopper, a water container, said hopper and said container being operatively associated with a balancing mechanism, a valve controlling admission of water to said container and actuated by said balancing mechanism so that said valve will be closed when said hopper and said container reach a balanced relationship, said container being capable of adjustment on said balancing mechanism so as to vary the ratio of water to cement when said container and said hopper reach a balanced relationship, and a compensating weight slidably carried by said balancing mechanism and adapted to compensate for the water content of the aggregate material to be mixed with the cement and water.

In testimony whereof I affix my signature.

JOHN GORDON AHLERS.